(12) United States Patent
Nicolas et al.

(10) Patent No.: US 11,664,915 B2
(45) Date of Patent: May 30, 2023

(54) MODULAR COMMUNICATION DEVICE

(71) Applicant: KERLINK, Thorigne-Fouillard (FR)

(72) Inventors: Samuel Nicolas, Cesson Sevigne (FR); Yannick Delibie, Thorigne-Fouillard (FR)

(73) Assignee: KERLINK, Thorigne-Fouillard (FR)

( * ) Notice: Subject to any disclaimer, the term of this patent is extended or adjusted under 35 U.S.C. 154(b) by 1183 days.

(21) Appl. No.: 16/313,080

(22) PCT Filed: Jul. 3, 2017

(86) PCT No.: PCT/FR2017/051804
§ 371 (c)(1),
(2) Date: Dec. 24, 2018

(87) PCT Pub. No.: WO2018/007742
PCT Pub. Date: Jan. 11, 2018

(65) Prior Publication Data
US 2019/0222336 A1 Jul. 18, 2019

(30) Foreign Application Priority Data
Jul. 4, 2016 (FR) ...................................... 1656360

(51) Int. Cl.
*H04W 4/70* (2018.01)
*H04J 3/08* (2006.01)
(Continued)

(52) U.S. Cl.
CPC ................. *H04J 3/08* (2013.01); *H04Q 9/02* (2013.01); *H04W 72/0446* (2013.01);
(Continued)

(58) Field of Classification Search
CPC ......... H04J 3/08; H04Q 9/02; H04Q 2209/40; H04W 72/0446; H04W 88/08; H04W 4/70; H04W 84/105; H05K 1/142; H05K 1/144
(Continued)

(56) References Cited

U.S. PATENT DOCUMENTS

| 9,582,449 B2 * | 2/2017 | Bennett ............... G06F 13/4247 |
| 2008/0162991 A1 * | 7/2008 | Dell .................... G06F 11/1012 |
| | | 714/25 |

(Continued)

FOREIGN PATENT DOCUMENTS

| CA | 2303605 A1 * | 10/2000 | ......... H04Q 11/0005 |
| FR | 2547082 A1 | 12/1984 | |
| FR | 2957747 A1 | 9/2011 | |

OTHER PUBLICATIONS

International Search Report for corresponding PCT application No. PCT/FR2017/051804, dated Sep. 15, 2017.

*Primary Examiner* — Tanmay K Shah
(74) *Attorney, Agent, or Firm* — Notaro, Michalos & Zaccaria P.C.

(57) ABSTRACT

The invention relates to a modular communication device having a master element with a control unit and bidirectional electrical control input-outputs, a series of modular elements having an upstream connection interface with a series of upstream input-output terminals disposed in locations forming a predetermined pattern, a downstream connection interface having a series of downstream input-output terminals disposed in locations forming the same predetermined pattern, a plurality of bidirectional electrical links connecting an upstream input-output terminal to a downstream input-output terminal in such a manner as to form a circular permutation between the ranks of the upstream and downstream input-output terminals electrically connected in pairs, (Continued)

and in which one of the electrical links is a local control link having an electronic communications module, the modular elements being connected to one another.

14 Claims, 5 Drawing Sheets

(51) Int. Cl.
*H04W 88/08* (2009.01)
*H04Q 9/02* (2006.01)
*H04W 72/0446* (2023.01)
*H04W 84/10* (2009.01)

(52) U.S. Cl.
CPC ........ *H04W 88/08* (2013.01); *H04Q 2209/40* (2013.01); *H04W 4/70* (2018.02); *H04W 84/105* (2013.01)

(58) Field of Classification Search
USPC ........................................................ 455/561
See application file for complete search history.

(56) References Cited

U.S. PATENT DOCUMENTS

| 2013/0114229 A1* | 5/2013 | Schmidt ................. H05K 1/142 361/785 |
| 2015/0288532 A1 | 10/2015 | Veysch et al. |

\* cited by examiner

MODULAR COMMUNICATION DEVICE

TECHNICAL FIELD

The invention relates to the field of modular electronic devices, in particular for digital wireless communications.

TECHNOLOGICAL BACKGROUND

The Internet of things consists in allowing everyday objects to automatically communicate data with a wireless network. For example, a water meter equipped with a communications module may automatically communicate a water reading to the company managing the invoicing of the water consumption.

Hub gateways, also referred to as base stations, have the role of radio reception and transmission of data coming from and intended for communications modules present in their area of coverage and also of relaying these data to equipment in charge of processing them, for example servers accessible over a network based on the IP protocol (Internet Protocol).

Several radio access technologies are available for the implementation of networks of communications modules. Purely by way of non-limiting illustration, the technologies LoRa™, Sigfox™ or else WM-Bus (Wireless Meter Bus), which are notably based on different types of modulation, may be mentioned.

These technologies have in common the provision of long-range communications which allow the number of gateways to be reduced by increasing the coverage of the latter.

It is advantageous to provide gateways with a modular structure supporting one or more boards arranged within a rack, each allowing a network or a particular service to be connected. However, in the absence of software intelligence on the boards, notably in the absence of assignment of an address for each board, each board must be specifically designed according to the rank that it occupies in the rack.

SUMMARY

One idea on which the invention is based is to provide a structure compatible with mass production of interchangeable boards.

Certain aspects of the invention derive from the idea of being able to supply peripheral boards that are independent of their rank in a modular device, for example a network interconnection device.

Certain aspects of the invention derive from the idea of being able to supply standardized connection boards.

Certain aspects of the invention derive from the idea of being able to operate without backplane.

In one embodiment, the invention provides a modular communication device comprising
  a master element comprising a control unit designed to generate electrical signals of the serial type, furthermore comprising N bidirectional electrical control input-outputs, each electrically connected to the control unit,
  a series of modular elements, each modular element comprising:
    an upstream connection interface comprising a series of N upstream input-output terminals disposed in locations forming a predetermined pattern,
    a downstream connection interface comprising a series of N downstream input-output terminals disposed in locations forming the same predetermined pattern,
    a plurality of bidirectional electrical links, each bidirectional electrical link connecting an upstream input-output terminal situated in a location of rank i within the predetermined pattern of the upstream connection interface to a downstream input-output terminal situated in a location of rank i−1 within the predetermined pattern of the downstream connection interface, in such a manner as to form a circular permutation between the ranks of the upstream and downstream input-output terminals electrically connected in pairs, and in which one of the electrical links is a local control link connected to an electronic communications module for which the electrical signals of the serial type are intended, in which the upstream input-output terminal connected to said local control link is an upstream local control terminal disposed in a location of predetermined rank within the pattern of the upstream connection interface, in such a manner that the location of the upstream local control terminal within the pattern of the upstream connection interface is the same location for all the modular elements, in which the modular elements are connected to one another via the upstream and downstream connection interfaces, the upstream connection interface of each modular element and the downstream connection interface of each modular element being complementary and designed to connect the downstream input-output terminals of a modular element to the upstream input-output terminals of same rank of the next modular element, in which the upstream input-output terminals of the first modular element are connected to the bidirectional electrical control input-output terminals of the master element.

By virtue of these features of the invention, a network interconnection device may be obtained in which:
  the connection between the various modular elements is standardized. This allows a gain in modularity with respect to the prior art.
  the communications are bidirectional through the electrical links and the upstream and downstream input-output terminals.
  any type of electrical signal may be communicated across the network interconnection device.

In some embodiments, the modular communication device according to the invention may furthermore comprise one or more of the features hereinbelow.

In some embodiments, the control unit is configured to generate an electrical signal multiplexed onto one of the N bidirectional electrical control input-outputs, the electrical signal comprising first control signals intended for a first electronic communications module of a first modular element of the series of modular elements and second control signals intended for a second electronic communications module of a second modular element of the series of modular elements, the first control signals and the second control signals being multiplexed over time.

In some embodiments, the series of modular elements comprises a number of modular elements greater than or equal to N.

In some embodiments, the number of modular elements of the series of modular elements is greater than N, and a rank i of the first modular element in the series of modular elements and a rank j of the second modular element in the series of modular elements have a relationship j=i[N], such that the first modular element and the second modular element are connected in series to said bidirectional electrical control input-output.

In some embodiments, the control unit is configured to generate an electrical signal multiplexed onto two of the N bidirectional electrical control input-outputs, the electrical signal comprising first control signals intended for a first electronic communications module of a first modular element of the series of modular elements and second control signals intended for a second electronic communications module of a second modular element of the series of modular elements, the first control signals and the second control signals being multiplexed over time.

In some embodiments, the control unit is configured to generate an electrical signal multiplexed over all of the N bidirectional electrical control input-outputs, the multiplexed electrical signal comprising control signals intended for each of the electronic communications modules of the modular elements of the series of modular elements, the control signals being multiplexed over time. In some embodiments, each modular element comprises a peripheral board and a connection board which are connected to each other. The connection board may be situated upstream or downstream of the peripheral board.

According to one embodiment in which the connection board is situated upstream of the peripheral board,
the peripheral board comprises:
the downstream connection interface, the peripheral board furthermore comprising:
an intermediate interface comprising a series of N upstream input-output terminals disposed in locations forming a second predetermined pattern,
a plurality of bidirectional electrical links, each bidirectional electrical link connecting an upstream input-output terminal situated in a location of rank i within the predetermined pattern of the intermediate interface to a downstream input-output terminal situated in a location of rank i within the second predetermined pattern of the downstream connection interface of the peripheral board, in which one of the electrical links is the local control link, the location of the upstream local control terminal within the pattern of the intermediate interface being the same location for all the peripheral boards,
the connection board comprises:
the downstream connection interface, the connection board furthermore comprising:
an intermediate interface comprising a series of N downstream input-output terminals disposed in locations forming the same second predetermined pattern,
a plurality of bidirectional electrical links, each bidirectional electrical link connecting an upstream input-output terminal situated in a location of rank i within the second predetermined pattern of the downstream connection interface of the connection board to a downstream input-output terminal situated in a location of rank i–1 within the predetermined pattern of the intermediate interface, in such a manner as to form a circular permutation between the ranks of the upstream and downstream input-output terminals electrically connected in pairs,
the peripheral board and the connection board being connected together via the intermediate interfaces, the intermediate interface of the connection board and the intermediate interface of the peripheral board being complementary and designed to connect the upstream input-output terminals of the intermediate interface of the peripheral board to the downstream input-output terminals of same rank of the intermediate interface of the connection board.

Alternatively, in the embodiment in which the connection board is situated downstream of the peripheral board,
the peripheral board comprises:
the upstream connection interface, the peripheral board furthermore comprising:
an intermediate interface comprising a series of N downstream input-output terminals disposed in locations forming a second predetermined pattern,
a plurality of bidirectional electrical links, each bidirectional electrical link connecting an upstream input-output terminal situated in a location of rank i within the predetermined pattern of the upstream connection interface to a downstream input-output terminal situated in a location of rank i within the second predetermined pattern of the intermediate interface of the peripheral board, in which one of the electrical links is the local control link, the location of the local control terminal within the pattern of the intermediate interface having the same location for all the peripheral boards,
the connection board comprises:
the downstream connection interface, the connection board furthermore comprising:
an intermediate interface comprising a series of N upstream input-output terminals disposed in locations forming the same second predetermined pattern,
a plurality of bidirectional electrical links, each bidirectional electrical link connecting an upstream input-output terminal situated in a location of rank i within the second predetermined pattern of the intermediate interface of the connection board to a downstream input-output terminal situated in a location of rank i–1 within the predetermined pattern of the downstream connection interface, in such a manner as to form a circular permutation between the ranks of the downstream and upstream input-output terminals electrically connected in pairs,
the peripheral board and the connection board being connected together via the intermediate interfaces, the intermediate interface of the connection board and the intermediate interface of the peripheral board being complementary and designed to connect the downstream input-output terminals of same rank of the intermediate interface of the peripheral board to the upstream input-output terminals of the intermediate interface of the connection board.

By virtue of these features, a network interconnection device may be obtained in which:
the connection boards are identical. This allows a gain in cost with respect to the prior art as boards with a single reference suffice.
the connection between the various peripheral boards is standardized. This allows a gain in modularity with respect to the prior art.
the communications are bidirectional through the electrical links and the upstream and downstream input-output terminals.
any type of electrical signal may be communicated across the network interconnection device.

In one embodiment, the peripheral board comprises the electronic communications module, the electronic communications module being configured to communicate wirelessly with connected objects, and the electrical signals emitted by the control unit are intended for the connected objects.

Depending on its functionalities, the electronic communications module may include all kinds of electrical and electronic components, notably printed circuit, microprocessor, switches, capacitors, transistors, diodes, resistors, radio interfaces, analog-digital converters (ADC) and digital-analog converters (DAC), etc.

The electronic communications module is designed to receive electrical signals, for example radio signals, from a device or from a network, for example from a radio network, and to transmit them to the control unit. The electronic communications module is furthermore designed to receive electrical signals from the control unit and to transmit them to a device or a network, for example a radio network.

In one embodiment, the electronic communications module comprises a radio terminal designed to be connected to a radio antenna so as to emit radio signals, the electronic communications module comprising a baseband processing module designed to demodulate the electrical signals in order to obtain radio signals intended for connected objects.

In one embodiment, the radio terminal is furthermore designed to be connected to a radio antenna for receiving radio signals originating from connected objects, the baseband processing being furthermore designed to demodulate the radio signals in order to obtain electrical signals intended for the control unit.

In one embodiment, the baseband processing module is configured to use radio protocols selected from within the list consisting of: SigFox, LoRa, WM-Bus, Z-Wave.

In one embodiment, the input-output terminals of the downstream and upstream connection interfaces respectively comprise mutually complementary male and female connectors, the male connector having an electrically conducting pin and the female connector having an electrically conducting orifice designed to establish an electrical connection with the conducting pin.

In one embodiment, the input-output terminals of the two intermediate interfaces respectively comprise mutually complementary male and female connectors, the male connector having an electrically conducting pin corresponding to an upstream or downstream input-output terminal and the female connector having an electrically conducting orifice designed to establish an electrical connection with the conducting pin.

In one embodiment, the electrical signals comprise logic control signals, for example a signal of the serial link, interrupt, input/ouput, chip select, etc. type. The electrical signals may also comprise data signals, for example clock update or global positioning data.

A data hub gateway is provided including the modular communication device according to any one of the embodiments described hereinabove and a network interface designed to establish a connection between a network and the control unit.

BRIEF DESCRIPTION OF THE FIGURES

The invention will be better understood, and other aims, details, features and advantages of the latter will become more clearly apparent in the course of the following description of several particular embodiments of the invention, presented solely by way of non-limiting illustration, with reference to the appended drawings.

DETAILED DESCRIPTION OF EMBODIMENTS

Figure 1:
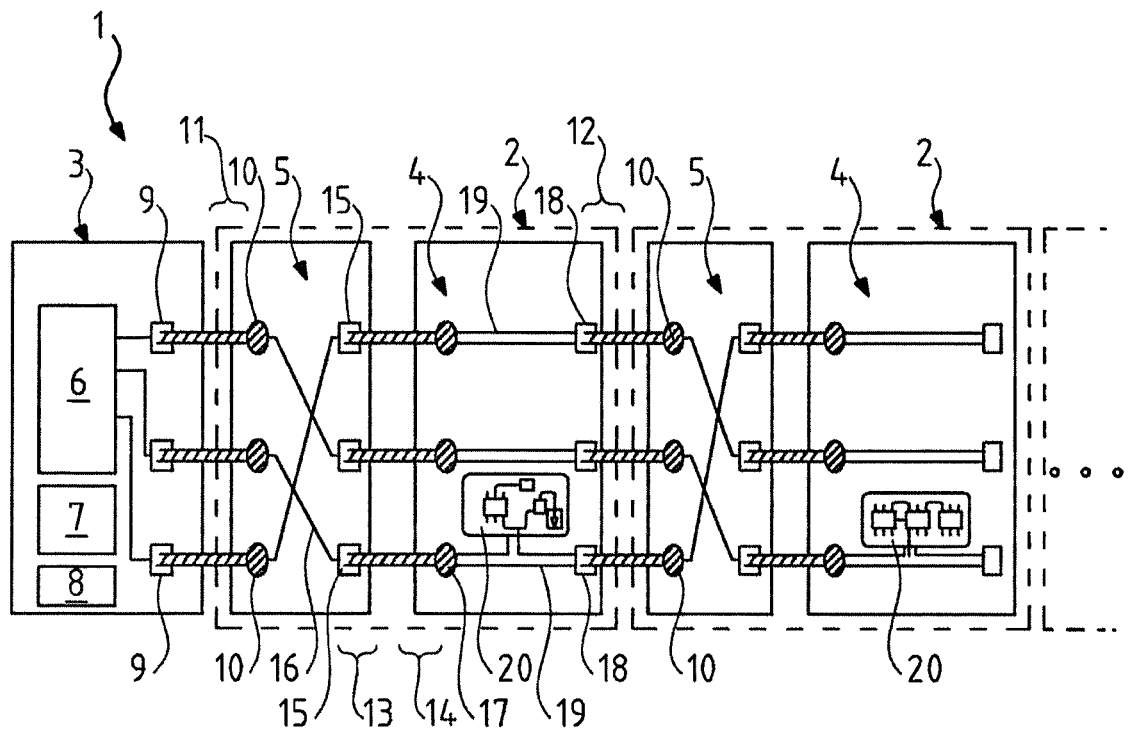
FIG. 1 is a diagram showing a network interconnection device of modular design.

FIG. 1 shows a network interconnection device 1 according to the invention. Such a device, also called base station or gateway, has a modular design so as to transmit electrical signals between a master element 3 and modular elements 2.

The modular elements 2 are connected together by daisy-chaining, one of the modular elements 2 being directly connected to the master element 3.

The master element 3 comprises all the software intelligence of the network interconnection device 1. The modular elements 2 comprise radio transmission peripheral boards 4 designed to convert control signals received from the master element into instructions for or coming from a remote object using radio protocols.

The master element 3, also referred to as motherboard, comprises a control unit 6. Such a control unit 6 is for example a central processing unit, or CPU, designed to execute instructions stored on a medium (not shown) in order to generate or to transmit electrical signals.

The master element 3 furthermore comprises an electrical power supply port 7 or a battery for supplying the network interconnection device 1 with electrical energy.

The master element 3 furthermore comprises an interface 8 with a device or a network. For example, the interface 8 is a RJ45 cable port.

Optionally, the master element 3 furthermore comprises a coaxial cable port, for example designed to receive an antenna for a Global Positioning System, or GPS (not shown).

The master element 3 comprises N bidirectional electrical control input-outputs 9, each electrically connected to the control unit 6. In the example shown in FIG. 1, the master element 3 comprises 3 electrical control input-outputs.

The network interconnection device 1 comprises at the most as many modular elements 2 as it comprises electrical control input-outputs 9. In the example in FIG. 1, the network interconnection device 1 comprises 3 modular elements 2 at the most.

The modular elements 2 may be standardized, as described hereinbelow.

Each modular element 2 comprises upstream input-output terminals 10 disposed according to a linear pattern on an upstream connection interface 11.

For example, the upstream input-output terminals 10 are male electrical pins.

Each modular element 2 comprises downstream input-output terminals 18 also disposed according to this linear pattern on a downstream interface 12.

For example, the downstream input-output terminals 18 are female electrical sockets.

Each modular element 2 comprises electrical links connecting the upstream input-output terminals 10 and the downstream input-output terminals 18 in pairs in a circular permutation.

These electrical links are for example links of the Universal Series Bus, or USB, type.

In the example in FIG. 1, each modular element 2 is composed of one connection board 5 and of one peripheral board 4.

A connection board 5 comprises the upstream connection interface and an intermediate interface 13 comprising a series of N downstream input-output terminals 15. The connection board 5 furthermore comprises electrical links 16 connecting the N upstream input-output terminals 10 to the N downstream input-output terminals 15, in pairs, according to a circular permutation. This connection board 5 allows the electrical signals to be routed without any software intelligence.

In the example in FIG. 1, the downstream input-output terminals 15 of the intermediate interface 13 are female electrical sockets, three in number and disposed according to the same linear pattern as the terminals of the interfaces 11 and 12.

A peripheral board 4 comprises the downstream connection interface 12 and an intermediate interface 14 comprising a series of N upstream input-output terminals 17 disposed according to the same pattern as the downstream input-output terminals 15 of the intermediate interface 13.

In the example in FIG. 1, the upstream input-output terminals 17 of the intermediate interface 14 are male electrical pins, three in number and disposed according to the same linear pattern.

The peripheral board 4 furthermore comprises electrical links 19 connecting the N upstream input-output terminals 17 to the N downstream input-output terminals 18 of same rank in the pattern, in pairs.

One of the electrical links 19 of the peripheral board 4 is a local control link comprising an electronic communications module 20.

The electronic communications module 20 of the i-th modular element 2 receives the signal addressed to it by the control unit 6 of the master element 3 via the i-th upstream input-output terminal 9.

The male plugs and the female sockets are pluggable in pairs so as to enable an electrical connection.

The pluggable connection of a peripheral board 4 onto a connection board 5 provides a modular element 2. The modular element 2 is also pluggable onto a second modular element 2 in order to provide a modular network interconnection device 1.

Thus, the network interconnection device 1 allows electrical signals, including control information, to be addressed to each electronic communications module 20 of the modular elements without a need for a software or hardware mechanism.

Notably, the modular elements may be readily plugged into one another, because they are designed to be standardized. For example, they may be mass produced.

Notably, the circular permutation of the electrical links between the input-output terminals of the upstream and downstream interfaces of the modular elements 2 allows each downstream input-output terminal of the master element 3 to be connected to the electronic communications module of a modular element 2, in particular. The rank of the modular element 2 determines to which downstream input-output terminal of the master element 3 it is connected.

The rank of the modular element 2 refers to its place in the chain of modular elements 2 daisy-chained together with respect to the master element 3.

The operation of such a network interconnection device 1 will now be described with reference to FIG. 2.

Figure 2:
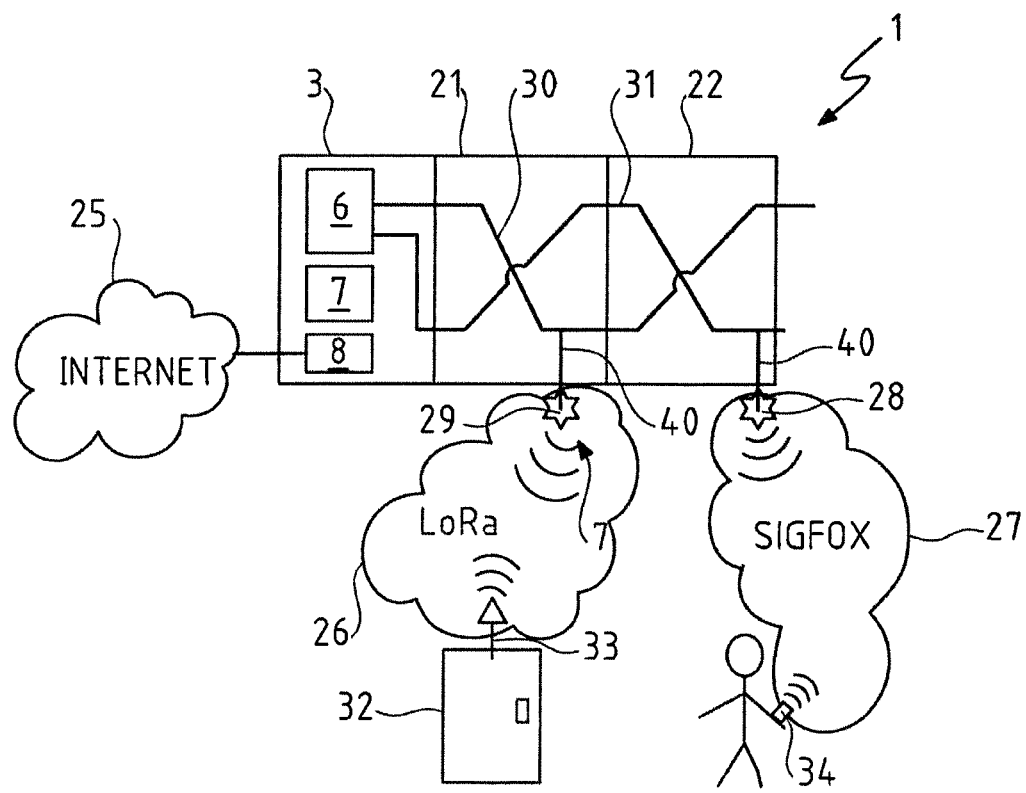
FIG. 2 is a diagram showing the network interconnection device in FIG. 1, communicating with connected objects.

FIG. 2 shows a network interconnection device 1 such as that in FIG. 1, comprising two modular elements 21 and 22.

The network interconnection device 1 allows the Internet 25 to be interconnected with other networks. In FIG. 2, the networks shown are networks using radio technologies: SigFox 27 and LoRa 26.

The network interconnection device 1 comprises two electrical links 30 and 31, each connected to the control unit 6 and each passing through the network interconnection device 1 via the two modular elements 21 and 22. The modular element 21 is of rank 1 and the modular element 22 is of rank 2.

The modular element 21 comprises an electrical module 20 (not shown) connected to an antenna 29. The radio antenna 29 is compatible with the LoRa 26 network.

The modular element 22 comprises an electrical module 20 (not shown) connected to an antenna 28. The radio antenna 28 is compatible with the SigFox 27 network.

The electrical connection 30 is electrically connected to the electrical module comprising the antenna 29, whereas the electrical connection 31 is electrically connected to the electrical module 20 comprising the antenna 28.

The control unit 6 emits and receives electrical signals from and to the radio antennas 28 and 29.

The electrical signals are notably inter-board connection signals of the serial type. For example, these signals are of the type:

serial link signals
interrupt signals
input/output signals
chip select signals
power supply signals.

The electrical signals include control and data information.

For example, the control unit 6 generates a request serial signal which is channeled via the electrical connection 30 up to the radio antenna 29.

The request signal is transmitted in the form of radio waves via the radio antenna 29. The radio waves emitted are compatible with the LoRa 26 network.

The request signal is received by a water meter 32 equipped with an antenna 33.

The water meter 32 responds to this request signal with a data signal comprising the latest reading from the water meter 32.

This data signal is channeled via the electrical connection 30 up to the control unit 6.

For example, the control unit 6 generates a serial signal for updating the time which is channeled via the electrical connection 31 up to the radio antenna 28.

The connected watch 34 receives the time-update signal via the SigFox 27 network.

Similarly, it is possible to control other connected objects (not shown) such as:

a tracker, for example a dog collar,
an RFID tag,
a refrigerator,
a surveillance video-camera,
connected lamps, for example urban infrastructure lamps,
  etc.

Other technologies may be envisioned, as long as an additional modular element 2 is provided and equipped with a radio antenna for the desired technology.

Here, two exemplary embodiments of a modular element will be described with reference respectively to FIGS. 3 and 4 and to FIG. 5.

Figure 3:
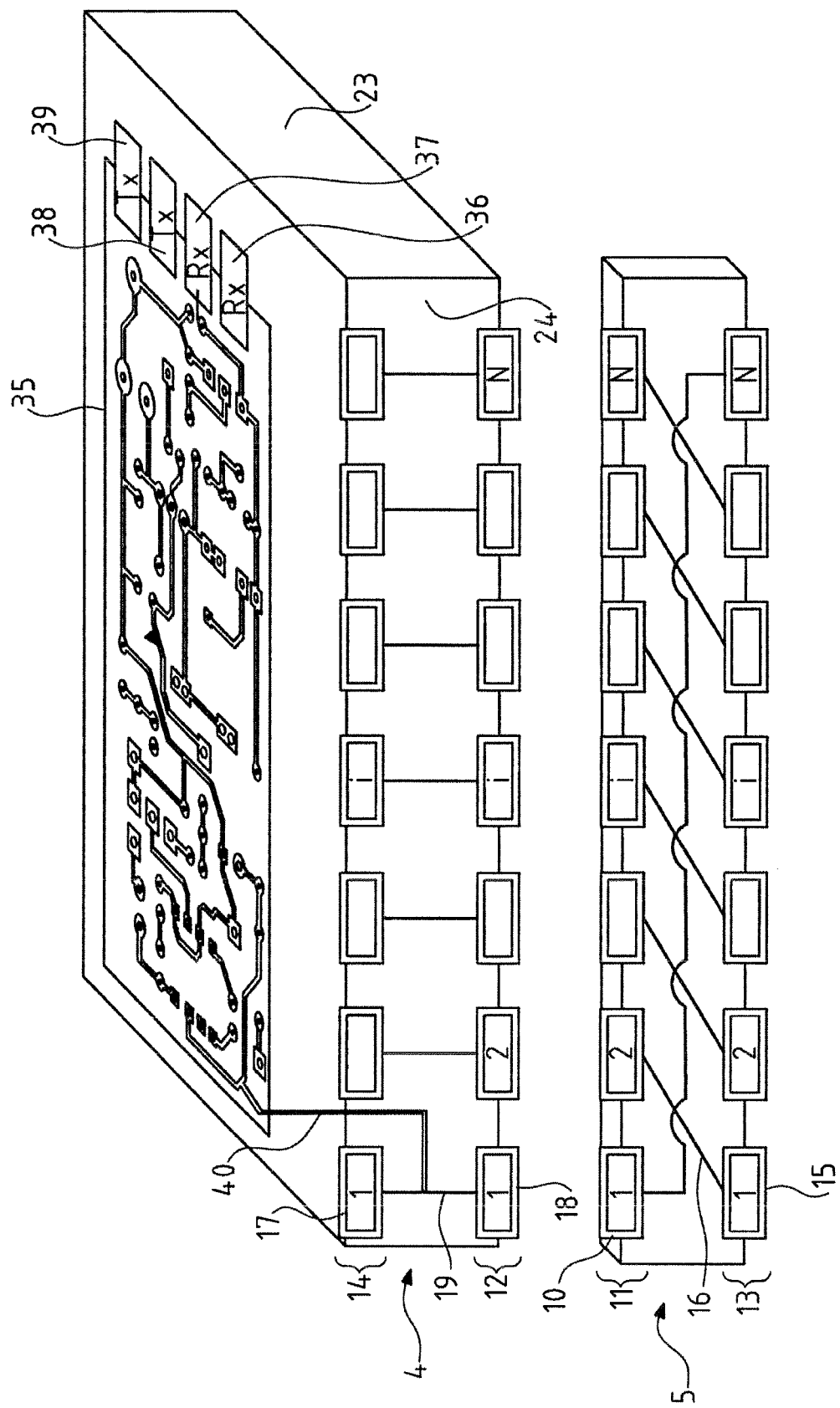
FIG. 3 is a diagram of a modular element according to a first embodiment.

FIG. 3 shows one exemplary embodiment of a peripheral board 4 and of a connection board 5. The peripheral boards 4 shown in this exemplary embodiment are standardized boards, mass produced in an identical manner to one another. The same goes for the connection boards 5.

The peripheral board 4 comprises a support 23 in the form of a horizontal tray, made for example of insulating plastic.

One of the lateral edges 24 of the support 23 is equipped with a connection element comprising the downstream connection interface 12 and the intermediate interface 14.

The intermediate connection interface 14 protrudes upward from the upper surface of the support 23 and the downstream connection interface 12 protrudes downward from the lower surface of the support 23.

The N upstream input-output terminals 17 of the intermediate interface 14 are disposed facing the N downstream input-output terminals 18 of the downstream connection interface 12. Each of the N upstream input-output terminals 17 is connected to the downstream input-output terminal 18 facing it by an electrical link 19.

The support 23 comprises the electronic communications module 20.

The electronic communications module 20 comprises a printed circuit 35 and logic electrical components, together with means of connecting an antenna 29.

In the example in FIG. 3, the antenna 29 is composed of two emitters Tx 38 and 39 and of two receivers Rx 36 and 37 in order to enable a bidirectional communication in duplex mode.

The means of connection are for example four coaxial cable ports for attaching an emitter or a receiver onto each one.

An electrical link 40 electrically connects the printed circuit 35 and the electrical link 19 between the upstream input-output terminal 17 and the downstream input-output terminal 18.

This electrical link 40 is disposed on the electrical link 19 which connects input-output terminals 17 and 18 of rank 1. In order to enable the daisy-chaining of the modular elements 2 together and the communication of electrical signals to each of them, all the peripheral boards 4 must be designed by disposing the electrical link 40 on the electrical link 19 of terminals of the same rank. On the other hand, there is no reason that rank 1 should be chosen for all the peripheral boards 4. Any given rank could equally be chosen for all the boards, for example the rank 2.

A connection board 5 is also shown in FIG. 3. The connection board is a vertical tray, made for example of insulating plastic.

The N upstream input-output terminals 10 are disposed on the upper edge of the vertical tray. The N downstream input-output terminals 15 are disposed on the lower edge of the vertical tray.

The N upstream input-output terminals 10 of the upstream connection interface 11 are disposed facing the N downstream input-output terminals 15 of the downstream interface 13. Each of the N upstream input-output terminals 10 is connected to the downstream input-output terminal 15 by an electrical link 16, in a circular permutation.

As shown, the upstream input-output terminal 10 of rank 1 is connected to the downstream input-output terminal 15 of rank N. The upstream input-output terminal 10 of rank i is connected to the downstream input-output terminal 15 of rank i−1. This choice shown in FIG. 3 is arbitrary and the circular permutation could be formed in the other direction. For example, another production standard may be chosen in which the upstream input-output terminal 10 of rank N is connected to the downstream input-output terminal 15 of rank 1 and the upstream input-output terminal 10 of rank i is connected to the downstream input-output terminal 15 of rank i+1.

Up to N peripheral boards and N connection boards may be assembled together in order to obtain the network interconnection device 1.

For this purpose, the downstream input-output terminals 15 of a connection board 5 must be aligned with the upstream input-output terminals 17 of a peripheral board 4 and be plugged in. A modular element 2 is then obtained, as shown in FIG. 4.

Then, the operation must be repeated with a new connection board 5 and a new peripheral board 4.

Each modular element 2 may be connected to another modular element 2 by plugging the upstream input-output terminals 10 of the upstream connection interface 11 of the connection board 5 of a first modular element 2 into the downstream input-output terminals 18 of the downstream connection interface 12 of the peripheral board 4 of a second modular element 2.

Figure 4:
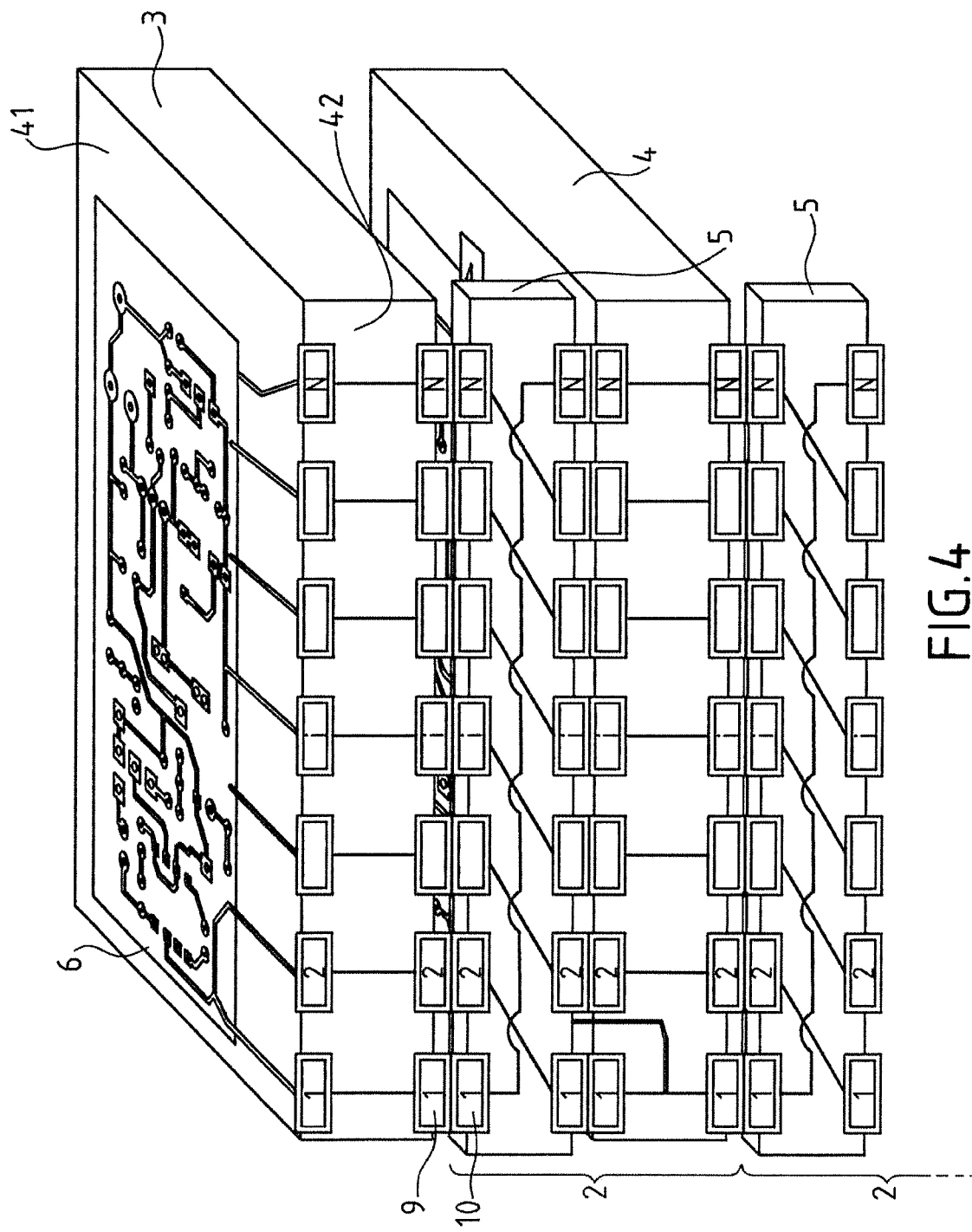
FIG. 4 is a diagram of daisy-chaining of modular elements according to the first embodiment.

The master element 3 shown in FIG. 4 comprises a support 41 in the form of a horizontal tray, made for example of insulating plastic.

In order to daisy-chain the modular elements 2 onto the master element 3, the modular element 2 of rank 1 must be plugged into the master element 3 by means of the downstream input-output terminals 9 and of the upstream input-output terminals 10.

Advantageously, the dimensions of the supports 23 and 41 are substantially identical. Notably, the length of the lateral edge 24 is identical to that of the lateral edge 25.

Advantageously, the dimensions of the connection boards 5 are substantially identical to the dimensions of the lateral edges 24 and 42.

The alignment of the upstream input-output terminals 17 and of the downstream input-output terminals 18, of the upstream input-output terminals 10 and of the downstream input-output terminals 15 notably allows an improvement in:
- the compactness of the network interconnection device 1;
- the facilitation of the plugging of the peripheral boards 4 and of the connection boards 5 into one another;
- the mass production of standardized peripheral boards.

Figure 5:
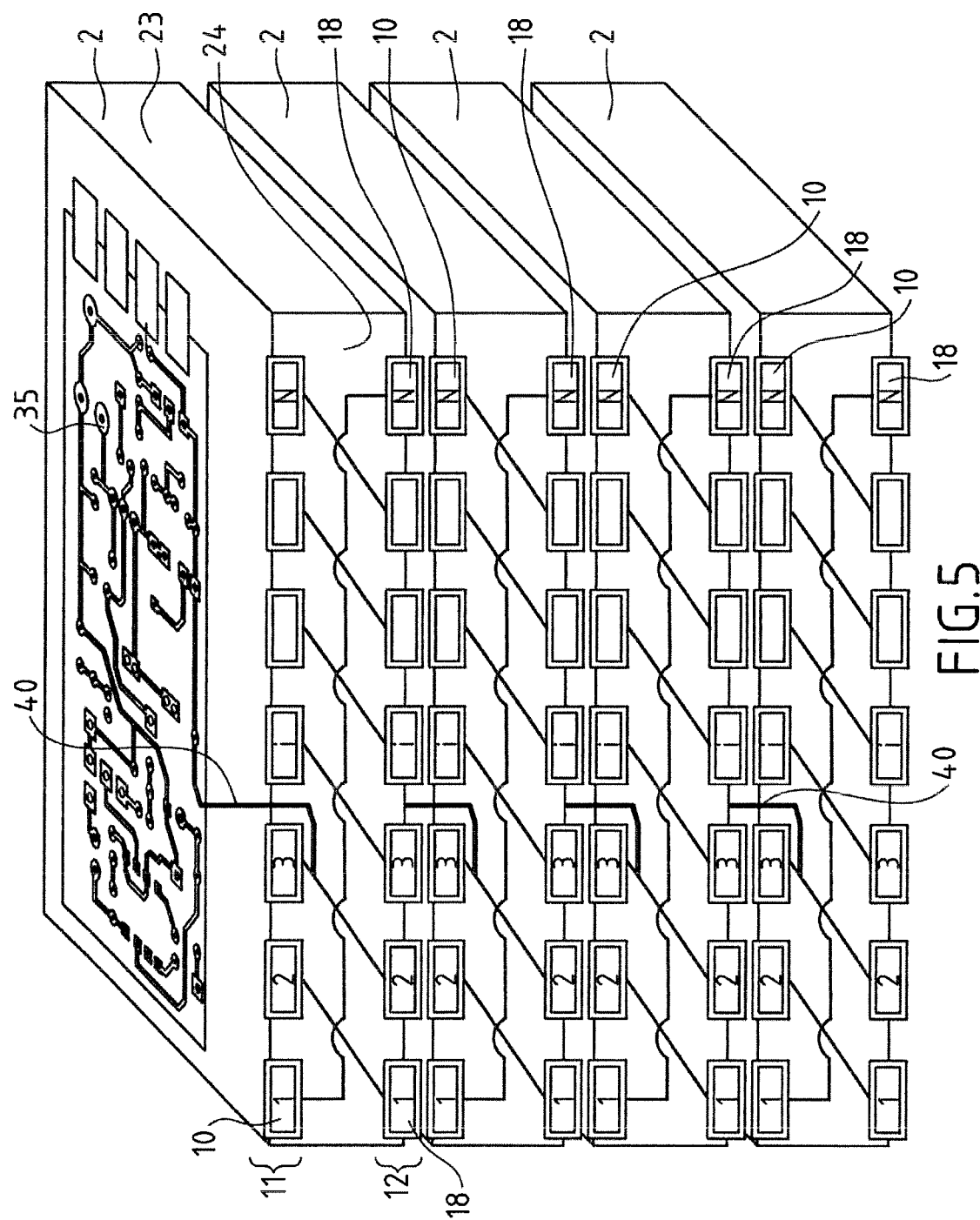
FIG. 5 is a diagram of daisy-chaining of modular elements according to a second embodiment.

FIG. 5 shows one variant embodiment of modular elements 2 in which there is no connection board 5. In FIG. 5, four modular elements 2 are daisy-chained together.

The elements identical or similar to those in the preceding figures are referenced using the same numbers.

Notably, a modular element 2 comprises a support 23 similar to that described with reference to FIGS. 3 and 4.

Each modular element 2 is of identical design.

The upstream input-output terminals 10 are directly connected to the downstream input-output terminals 18 by circular permutation.

This variant allows the assembly of network interconnection devices to be simplified by reducing the number of elements to be daisy-chained to one another.

Figure 6:
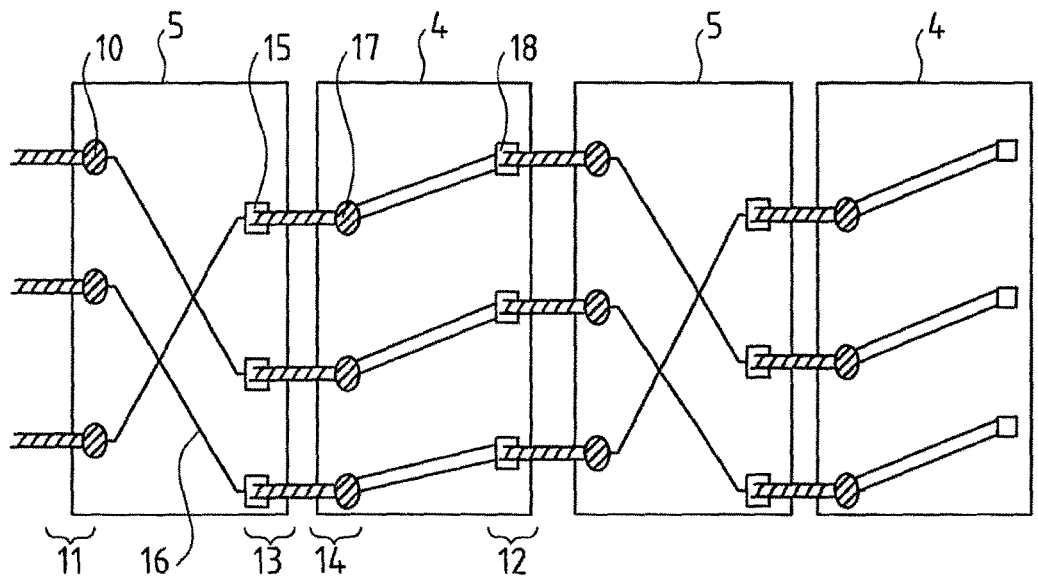
FIG. 6 shows a variant of connectivity of the peripheral boards and of the connection boards.

FIG. 6 shows one embodiment of the invention in which the daisy-chaining of the peripheral boards is made possible by connecting together connection boards having a first pattern of disposition of the upstream input-output terminals 10 on their upstream connection interface 11 different from a second pattern of disposition of the downstream input-output terminals 15 on their intermediate interface 13.

In this embodiment of the invention, the upstream input-output terminals 17 of the peripheral boards 4 are disposed according to the second pattern and the downstream input-output terminals 18 of the peripheral boards are disposed according to the first pattern in order to make possible the daisy-chaining of the peripheral boards 4 by means of the connection boards 5.

Figure 7:
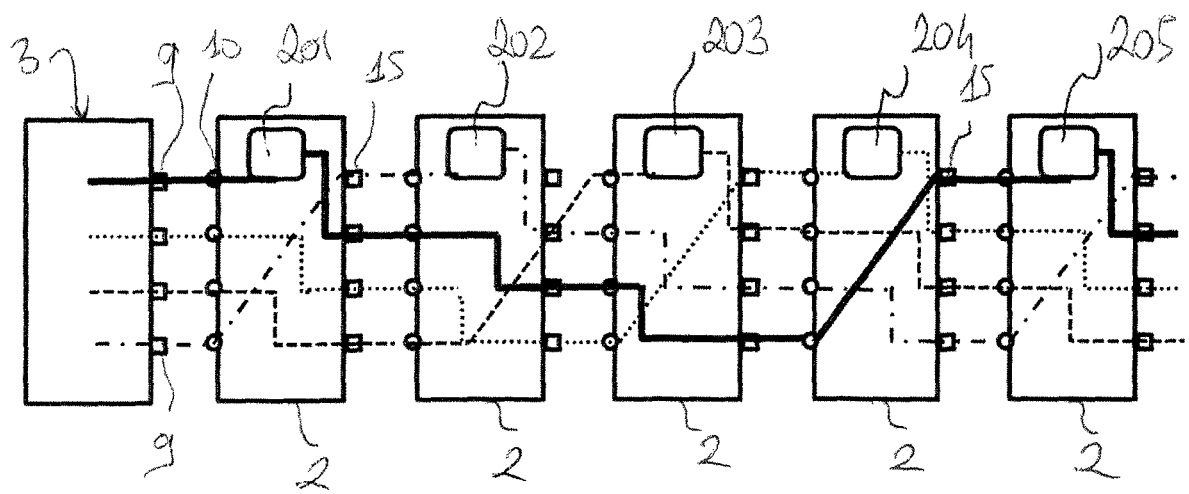
FIG. 7 shows a diagram of daisy-chaining of modular elements according to one embodiment.

With reference to FIG. 7, a diagram of daisy-chaining of modular elements 2 is shown.

In this diagram, the number N of bidirectional electrical control input-outputs is equal to four and the number of modular elements 2 is equal to 5.

The master element 3 comprises the control unit 6 (not shown) which is designed to generate electrical signals of the serial type for each of the four bidirectional electrical control input-output terminals 9 electrically connected to the control unit 6 of the master element.

The four electrical line chains carrying the electrical signals are shown starting from the four terminals 9, each with a different dashed-line format, except that the first electrical line chain starting from the first terminal 9 is shown as a solid line.

As shown, each electrical line chain supplies a respective electronic communications module 201, 202, 203 and 204 according to the rank of the terminal 9 to which the electrical line chain is attached.

Notably, in this figure, the electronic communications module 201 is electrically powered and supplied with control signals via the electrical line shown as a solid line.

This electrical line is not interrupted after the electronic communications module 201. On the contrary, this electrical line continues via the connection between the upstream terminal 10 of rank 1 and the downstream terminal 15 of rank 2 of the modular element 2.

Thus, the control signals and the electrical power supply carried by the electrical line connected to the terminal 9 of rank 1 of the master element 3 are channeled up to the downstream terminal 15 of the modular element 2 of rank 4.

A fifth modular element 2 may be connected to the modular element 2 of rank 4 following the same principle as previously described.

The electrical line shown as a solid line therefore also supplies the electronic communications module 205 of the modular element 2 of rank 5.

The control signals carried by the electrical line shown as a solid line therefore supply power to both the electronic communications module 201 of the modular element of rank 1 and the electronic communications module 205 of the modular element 2 of rank 5.

Advantageously, the terminal 9 of rank 1 of the master element 3 is able to deliver a signal over the whole length of the electrical line shown as a solid line. This signal comprises the control signal intended for the electronic communications module 201 and the control signal intended for the electronic communications module 205, the two control signals being multiplexed over time.

Although FIG. 7 shows the example of a daisy-chaining of five modular elements 2 using four terminals 9 of the master element 3, the same principle may be applied to any given number of modular elements and of terminals 9 of the master element.

Similarly, although the electronic communications modules shown in FIG. 7 are connected to the upstream terminal 10 of rank 1, it is possible to design modular elements whose electronic communications modules are connected to an upstream terminal 10 of another predefined rank, for example the last rank as shown in FIG. 1. The daisy-chaining of a number of modular elements 2 greater than the number of terminals 9 of the master element 3 would also be possible following the same principle as previously described.

Advantageously, in order to allow the modular elements to be connected to one another without worrying about their rank, the master element 3 is designed to deliver, via each of its terminals 9, a signal comprising the control signals intended for each of the electronic communications modules 201, 202, 203, 204 and 205. The control signals are then multiplexed over time so as to only form a single signal distributed over each of the electrical lines.

Generally speaking, it is possible to permute the rank of the modular elements 2 shown in FIGS. 1, 2, 4, 5, 6 and 7 as long as the master element 3 is able to deliver, via each of its terminals 9, a signal comprising the control signals intended for each of the electronic communications modules 20 carried by each of the modular elements 2.

It is also possible to allow the permutation of rank of two modular elements 2 of given ranks by delivering a time-multiplexed signal comprising the control signals intended for each of these modular elements 2 of ranks defined by the two terminals 9 of corresponding rank.

Although the invention has been described in association with several particular embodiments, it goes without saying that it is not in any way limited to these and that it includes all the technical equivalents of the means described, together with their combinations, if the latter fall within the framework of the invention.

Notably, the patterns of the input-output terminals illustrated in the figures are illustrative examples. The input-output terminals may be disposed according to any other geometrical pattern, for example in a zigzag or wavy line, in a grid, in concentric rings, in polygonal patterns such as for example a staggered configuration, etc.

Notably, a peripheral board may be equipped on its intermediate interface and on its downstream interface with all male plugs; in this case, the connection board will be equipped with all female plugs. Conversely, a peripheral board may be equipped on its intermediate interface and on its downstream interface with all female plugs, and in this case the connection board will be equipped with all male plugs.

The use of the verb "comprise" or "include" and of its conjugated forms does not exclude the presence of elements or of steps other than those mentioned in a claim. The use of the indefinite article "a" or "an" for an element or a step does not exclude, unless stated otherwise, the presence of a plurality of such elements or steps.

In the claims, any reference sign between parentheses should not be interpreted as a limitation of the claim.

The invention claimed is:

1. A modular communication device (1) comprising
    a master element (3) comprising a control unit (6) designed to generate electrical signals of the serial type, furthermore comprising N bidirectional electrical control input-outputs (9), each electrically connected to the control unit (6), wherein N is an integer greater than 1,
    a series of modular elements (2), each modular element (2) comprising:

an upstream connection interface (11, 14) comprising a series of N upstream input-output terminals (10, 17) disposed in locations forming a predetermined pattern, a downstream connection interface (12, 13) comprising a series of N downstream input-output terminals (18, 15) disposed in locations forming the same predetermined pattern, a plurality of bidirectional electrical links (16, 19), each bidirectional electrical link connecting an upstream input-output terminal (10) situated in a location of rank i within the predetermined pattern of the upstream connection interface (11) to a downstream input-output terminal (18) situated in a location of rank i−1 within the predetermined pattern of the downstream connection interface (12), where i is an integer between 2 and N, and connecting an upstream input-output terminal (10) situated in a location of rank i to a downstream input-output terminal (18) situated in a location of rank N, where i is the integer 1, in such a manner as to form a circular permutation between the ranks of the upstream (10) and downstream (18) input-output terminals electrically connected in pairs, and in which one of the electrical links (16, 19) is a local control link (40) connected to an electronic communications module (20) for which the electrical signals of the serial type are intended, in which the upstream input-output terminal (17, 10) connected to said local control link (40) is an upstream local control terminal disposed in a location of predetermined rank within the pattern of the upstream connection interface (11), in such a manner that the location of the upstream local control terminal within the pattern of the upstream connection interface (11) is the same location for all the modular elements (2), in which the modular elements (2) are connected to one another via the upstream (11) and downstream (12) connection interfaces, the upstream connection interface (11) of each modular element (2) and the downstream connection interface (12) of each modular element (2) being complementary and designed to connect the downstream input-output terminals (18) of a modular element (2) to the upstream input-output terminals (10) of same rank of the next modular element (2), in which the upstream input-output terminals (10) of a first modular element (2) of the series are connected to the bidirectional electric input-output control terminals (9) of the master element (3), and in which the series of modular elements (2) comprises a number of modular elements (2) greater than N.

2. The device as claimed in claim 1, in which the control unit is configured to generate an electrical signal multiplexed onto one of the N bidirectional electrical control input-outputs (9), the electrical signal comprising first control signals intended for a first electronic communications module (20) of the first modular element (2) of the series of modular elements and second control signals intended for a second electronic communications module (20) of a second modular element (2) of the series of modular elements, the first control signals and the second control signals being multiplexed over time.

3. The device as claimed in claim 1, in which a rank i of the first modular element (2) in the series of modular elements (2) and a rank j of a second modular element (2) in the series of modular elements (2) has a relationship j=i[N], wherein j is an integer, in such a manner that the first modular element and the second modular element are connected in series to said bidirectional electrical control input-output (9).

4. The device as claimed in claim 1, in which the control unit is configured to generate an electrical signal multiplexed onto two of the N bidirectional electrical control input-outputs (9), the electrical signal comprising first control signals intended for a first electronic communications module (20) of a first modular element (2) of the series of modular elements and second control signals intended for a second electronic communications module (20) of a second modular element (2) of the series of modular elements, the first control signals and the second control signals being multiplexed over time.

5. The device as claimed in claim 1, in which the control unit is configured to generate an electrical signal multiplexed over all of the N bidirectional electrical control input-outputs (9), the multiplexed electrical signal comprising control signals intended for each of the electronic communications modules (20) of the modular elements (2) of the series of modular elements, the control signals being multiplexed over time.

6. The device as claimed in claim 1, in which each modular element (2) comprises a peripheral board (4) and a connection board (5), the peripheral board (4) comprising:
the downstream connection interface, the peripheral board (4) furthermore comprising:
an intermediate interface (14) comprising a series of N upstream input-output terminals (17) disposed in locations forming a second predetermined pattern,
a plurality of bidirectional electrical links (19), each bidirectional electrical link connecting an upstream input-output terminal (17) situated in a location of rank i within the predetermined pattern of the intermediate interface to a downstream input-output terminal (18) situated in a location of rank i within the second predetermined pattern of the downstream connection interface of the peripheral board (4), in which one of the electrical links (19) is the local control link (40), the location of the upstream local control terminal within the pattern of the intermediate interface (14) being the same location for all the peripheral boards (4), the connection board (5) comprising
the downstream connection interface (11), the connection board (5) furthermore comprising:
an intermediate interface (13) comprising a series of N downstream input-output terminals (15) disposed in locations forming the same second predetermined pattern,
a plurality of bidirectional electrical links (16), each bidirectional electrical link connecting an upstream input-output terminal (10) situated in a location of rank i within the second predetermined pattern of the downstream connection interface (11) of the connection board (5) to
a downstream input-output terminal (15) situated in a location of rank i−1 within the predetermined pattern of the intermediate interface (13), in such a manner as to form a circular permutation between the ranks of the upstream (10) and downstream (15) input-output terminals electrically connected in pairs, the peripheral board (4) and the connection board (5) being connected together via the intermediate interfaces (13, 14), the intermediate interface (13) of the connection board (5) and the intermediate interface

(14) of the peripheral board (4) being complementary and designed to connect the upstream input-output terminals (17) of the intermediate interface (14) of the peripheral board (4) to the downstream input-output terminals (15) of same rank of the intermediate interface (13) of the connection board (5).

7. The device as claimed in claim 6, in which the peripheral board (4) comprises the electronic communications module (20), the electronic communications module being configured for communicating wirelessly with connected objects, and in which the electrical signals emitted by the control unit (6) are intended for the connected objects (32, 34).

8. The device as claimed in claim 6, in which the input-output terminals of the two intermediate interfaces (13 and 14) respectively include mutually complementary male and female connectors, the male connector having an electrically conducting pin corresponding to an upstream or downstream input-output terminal and the female connector having an electrically conducting orifice designed to establish an electrical connection with the conducting pin.

9. The device as claimed in claim 1, in which each modular element (2) comprises a peripheral board (4), and a connection board (5), the peripheral board (4) comprising:
the upstream connection interface (14), the peripheral board (4) furthermore comprising:
an intermediate interface (12) comprising a series of N downstream input-output terminals (18) disposed in locations forming a second predetermined pattern,
a plurality of bidirectional electrical links (19), each bidirectional electrical link connecting an upstream input-output terminal (17) situated in a location of rank i within the predetermined pattern of the upstream connection interface (14) to a downstream input-output terminal (18) situated in a location of rank i within the second predetermined pattern of the intermediate interface (18) of the peripheral board (4), in which one of the electrical links (19) is the local control link (40), the location of the local control terminal within the pattern of the intermediate interface (12) being the same location for all the peripheral boards, the connection board (5) comprising:
the downstream connection interface (13), the connection board (5) furthermore comprising:
an intermediate interface (11) comprising a series of N upstream input-output terminals (10) disposed in locations forming the same second predetermined pattern,
a plurality of bidirectional electrical links (16), each bidirectional electrical link connecting an upstream input-output terminal (10) situated in a location of rank i within the second predetermined pattern of the intermediate interface (11) of the connection board (5) to a downstream input-output terminal (15) situated in a location of rank i−1 within the predetermined pattern of the downstream connection interface (13), in such a manner as to form a circular permutation between the ranks of the downstream (15) and upstream (10) input-output terminals electrically connected in pairs, the peripheral board (4) and the connection board (5) being connected together via the intermediate interfaces (11, 12), the intermediate interface (11) of the connection board (5) and the intermediate interface (12) of the peripheral board (4) being complementary and designed to connect the downstream input-output terminals (18) of the intermediate interface (12) of the peripheral board (4) to the upstream input-output terminals (10) of same rank of the intermediate interface (11) of the connection board (5).

10. The device as claimed claim 1, in which the electronic communications module (20) comprises a radio terminal designed to be connected to a radio antenna (29) so as to emit radio signals, the electronic communications module (20) comprising a baseband processing module designed to demodulate the electrical signals in order to obtain radio signals intended for connected objects.

11. The device as claimed in claim 10, in which the terminal radio is furthermore designed to be connected to a radio antenna (29) for receiving radio signals originating from connected objects, the baseband processing module being furthermore designed to demodulate radio signals in order to obtain electrical signals intended for the control unit (6).

12. The device as claimed in claim 10, in which the baseband processing module is configured to use protocols for long-distance radio communications, selected from within the list consisting of: SigFox, LoRa, WM-Bus, Z-Wave.

13. The device as claimed in claim 1, in which the input-output terminals of the downstream and upstream connection interfaces (11 and 12) respectively include mutually complementary male connectors and female connectors, the male connector having an electrically conducting pin and the female connector having an electrically conducting orifice designed to establish an electrical connection with the conducting pin.

14. A data hub gateway including the modular communication device as claimed in claim 1 and a network interface designed to establish a connection between a network and the control unit (6).

* * * * *